United States Patent

Yoshikawa et al.

[11] Patent Number: 6,142,922
[45] Date of Patent: Nov. 7, 2000

[54] CONDUCTIVE ROLLER

[75] Inventors: Hitoshi Yoshikawa, Komaki; Shoji Arimura, Bisai; Akihiko Kaji, Inazawa; Kenichi Ohkuwa, Inuyama, all of Japan

[73] Assignee: Tokai Rubber Industries, Ltd., Komaki, Japan

[21] Appl. No.: 09/341,431

[22] PCT Filed: Nov. 10, 1998

[86] PCT No.: PCT/JP98/05058

§ 371 Date: Aug. 31, 1999

§ 102(e) Date: Aug. 31, 1999

[87] PCT Pub. No.: WO99/24487

PCT Pub. Date: May 20, 1999

[30] Foreign Application Priority Data

Nov. 11, 1997 [JP] Japan .................................. 9-309063
Jan. 29, 1998 [JP] Japan .................................. 10-017060

[51] Int. Cl.$^7$ .................................................. B23P 15/00
[52] U.S. Cl. .................................................. 492/56; 492/59
[58] Field of Search ........................ 492/56, 59; 428/36.9, 428/35.8

[56] References Cited

U.S. PATENT DOCUMENTS 5,895,689  4/1999  Gajewski .................................. 492/56
5,993,366  11/1999  Kaji et al. .................................. 492/56

FOREIGN PATENT DOCUMENTS 03187732  8/1991  Japan .
05323777  12/1993  Japan .
09305024  11/1997  Japan .

OTHER PUBLICATIONS

Patent Abstr. of Japan, No. 08–333433, Publ. Dec. 1996 (Bridgestone Corp.).
Patent Abstr. of Japan, No. 07–301974, Publ. Nov. 1995 (Bando Chemical Industries, Ltd.).
Patent Abstr. of Japan, No. 63–196617, Publ. Aug. 1998 (Sanyo Chemical Industries, Ltd.).
Patent Abstr. of Japan, No. 05–230161, Pub. Sep. 1993 (Shin–Etsu Chemical Co., Ltd.).

*Primary Examiner*—Irene Cuda
*Attorney, Agent, or Firm*—Armstrong, Westerman, Hattori, McLeland & Naughton

[57] ABSTRACT

A conductive roll to be used as a developing roll, a charging roll, a transfer roll or the like in an electrophotographic apparatus such as a copying machine, a printer or a facsimile, of the present invention comprises a base rubber layer formed on a peripheral surface of a shaft, an intermediate layer formed on a peripheral surface of the base rubber layer, and a surface layer formed on a peripheral surface of the intermediate layer, the surface layer being composed of a resin composition comprising:

(A) a silicone-grafted acrylic polymer which comprises repeating units represented by the following general formula (1), wherein an acrylic polymer portion of the silicone-grafted acrylic polymer exclusive of a structural portion derived from a siloxane has a glass-transition temperature of −35 to 30° C.:

$$-(Y)_k--(Z)_n-- \qquad (1)$$

(wherein Y is a structural portion derived from an acrylic monomer; Z is a structural portion derived from the acrylic monomer, which has a graft portion derived from a siloxane; k is a positive number of 1 to 3,000; and n is a positive number of 1 to 3,000); and (B) an isocyanate curing agent.

18 Claims, 2 Drawing Sheets

CONDUCTIVE ROLLER

TECHNICAL FIELD

The present invention relates to a conductive roll to be used as a developing roll, a charging roll, a transfer roll or the like in an electrophotographic apparatus such as a copying machine, a printer or a facsimile.

BACKGROUND ARTS

Conventional conductive rolls for use in electrophotographic apparatuses have a surface layer typically composed of a material containing a urethane resin as a principal component thereof and a conductive material. Recently, a low-torque motor has been employed for size reduction and cost reduction of the electrophotographic apparatuses and, if a urethane resin having an excessively high hardness is used as the surface layer material for the conductive roll, smooth rotation of the conductive roll cannot be ensured at the start up and a click sound may occur due to stick-slip. In order to overcome these problems, conductive rolls have been proposed which employ a urethane resin having a low hardness (Japanese Patent Provisional Publication Nos. 5-323777 (1993) and 3-187732(1991)).

Since the low hardness urethane resin has a relatively high friction coefficient, toner tends to thermally and physically adhere to the surface of the conductive roll, thereby easily causing toner filming. As a result, a satisfactory charging property cannot be ensured, so that image quality will be deteriorated as the number of image outputs increases. A possible method for reducing the friction coefficient of the urethane resin is to enhance the hardness or crystallinity of the urethane resin. However, the enhancement of the hardness of the urethane resin does not satisfy the requirement for the lower hardness, so that the smooth rotation of the roll at the start up may be disturbed as described above. Meanwhile, the enhancement of the urethane resin crystallinity leads to a lower solubility of the urethane resin in a solvent. Therefore, a usable solvent is limited to a highly volatile solvent, and proper application of the urethane resin is impossible. Accordingly, workablity in manufacturing the conductive roll will be deteriorated.

In order to overcome these problems, the inventors have come up with a resin composition containing a silicone-grafted acrylic polymer and a thermoplastic urethane resin, and proposed a conductive roll having a surface layer composed of the resin composition (Japanese Patent Provisional Publication No.9-305024(1997)).

The thermoplastic urethane resin contained in the surface layer material for the conductive roll disclosed in Japanese Patent Provisional Publication No. 9-305024 has a weak positive charge property and, therefore, the thermoplastic urethane resin is modified by dispersing therein the silicone-grafted acrylic polymer having a strong positive charge property. However, the silicone-grafted acrylic polymer has an insufficient compatibility with the thermoplastic urethane resin and, hence, the silicone-grafted acrylic polymer is locally present on the surface of the surface layer. This leads to aggravated toner scattering, inferior smear resistance, insufficient toner releasability, and frequent occurrence of toner filming. Against these problems further improvement is required

DISCLOSURE OF THE INVENTION

In view of the foregoing, it is an object of the present invention to provide a conductive roll which is superior both in smear resistance and in toner-filming resistance.

In order to achieve the aforementioned objective, according to the present invention, there is provided a conductive roll which comprises a base rubber layer formed on a peripheral surface of a shaft, an intermediate layer formed on a peripheral surface of the base rubber layer, and a surface layer formed on a peripheral surface of the intermediate layer, the surface layer being composed of a resin composition comprising:

(A) a silicone-grafted acrylic polymer which comprises repeating units represented by the following general formula (1), wherein an acrylic polymer portion of the silicone-grafted acrylic polymer exclusive of a structural portion derived from a siloxane has a glass-transition temperature of −35 to 30° C.:

$$-(Y)_k- -(Z)_n- \qquad (1)$$

(wherein Y is a structural portion derived from an acrylic monomer; Z is a structural portion derived from the acrylic monomer, which has a graft portion derived from a siloxane; k is a positive number of 1 to 3,000; and n is a positive number of 1 to 3,000); and (B) an isocyanate curing agent.

As a result of intensive studies to obtain a conductive roll having a good smear resistance and toner-filming resistance, the inventors of the present invention have found that the isocyanate curing agent (B) used, as a material for forming the surface layer of the conductive roll, along with the specific silicone-grafted acrylic polymer (A), enhances the cross-linking of the silicone-grafted acrylic polymer (A) and the resin composition which forms the surface layer of the conductive roll has an appropriately cross-linked state. Thus, the inventors have attained the invention to accomplish the aforesaid object.

The resin composition may comprise a specific acryl-grafted silicone polymer (C) in addition to the silicone-grafted acrylic polymer (A) and the isocyanate curing agent (B). When the surface layer of the conductive roll is formed of the resin composition, the acryl-grafted silicone polymer (C) deposits on the surface of the surface layer during solvent volatilization, so that the surface layer of the conductive roll is prevented from being perfectly covered with the silicone component. This prevents the toner filming which may otherwise occur due to overcharged toner, thereby further enhancing the toner releasability.

BEST MODE FOR CARRYING OUT THE INVENTION

The present invention will hereinafter be described in detail by way of embodiments thereof.

Figure 1:
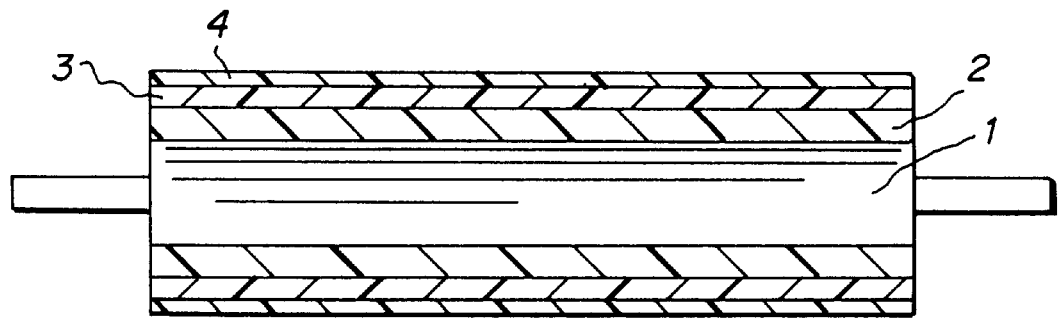
FIG. 1 is a cross-sectional view showing a conductive roll according to one embodiment of the present invention.

FIG. 1 shows a conductive roll according to one embodiment of the present invention. The conductive roll includes a base rubber layer 2 formed on the peripheral surface of a shaft 1, an intermediate layer 3 formed on the peripheral surface of the base rubber layer 2 and a surface layer 4 formed on the peripheral surface of the intermediate layer 3. A main feature of the conductive roll of the present invention is that the surface layer 4 is formed of a specific resin composition.

The material and construction of the shaft 1 are not particularly limited. The shaft may be, for example, a solid metal rod, a hollow metal cylinder or the like. Exemplary materials for the shaft 1 include stainless steel's, aluminum, plated iron and the like. An adhesive, a primer or the like may, if desired, be applied onto the shaft 1. Conductivity may, if desired, be imparted to the adhesive, the primer and the like.

The material for the base rubber layer 2 is not particularly limited, but examples thereof include silicone rubbers, ethylene-propylene-diene rubbers (EPDM), styrene-butadiene rubbers (SBR) and polyurethane elastomers, among which a silicone rubber is preferred because of its low hardness and high compression set. Where a silicone rubber is used as the material for the base rubber layer 2, the base rubber layer 2 may be subjected to corona discharge, plasma discharge or the like for activation of a silicon rubber surface, and then coated with a primer.

A conductive agent may optionally be added to the material for the base rubber layer 2. Examples of the conductive agent include carbon black, graphite, potassium titanate, ironoxide, c-TiO$_2$, c-ZnO, c-SnO$_2$, and ion conductors (e.g., quaternary ammonium salts, borates, surfactants). The —prefix "c-" herein means "conductive".

The material for the intermediate layer 3 is not particularly limited, but examples thereof include acrylonitrile-butadiene rubbers (nitrile rubbers, hereinafter abbreviated to "NBR"), hydrogenated acrylonitrile-butadiene rubbers (hydrogenated nitrile rubbers, hereinafter abbreviated to "H-NBR"), polyurethane elastomers, chloroprene rubbers (CR), natural rubbers, butadiene rubbers (BR), butyl rubbers (IIR), hydrin rubbers (ECO, CO) and nylons, among which a H-NBR is preferred because of its excellent adhesive property and stability in a coating liquid.

A vulcanization agent such as sulfur, a vulcanization accelerator such as guanidine, thiazole, sulfonamide, a salt of dithiocarbamic acid or a thiuram, stearic acid, ZnO (zinc white), a softener, a conductive agent and the like may optionally be added to the material for the intermediate layer 3. Examples of the conductive agent used for the intermediate layer 3 include those previously mentioned.

The surface layer 4 is formed of a specific resin composition containing a specific silicone-grafted acrylic polymer (A) and an isocyanate curing agent (B).

The silicone-grafted acrylic polymer (A) comprises repeating units represented by the following general formula (1). In the present invention, the silicone-grafted acrylic polymer (A) is obtained by copolymerization of a structural portion represented by Y and a structural portion represented by Z in the following formula, and has such a structure that an acrylic polymer trunk portion is grafted with the siloxane-derived graft portion (silicone portion).

$$—(Y)_k——(Z)_n— \quad (1)$$

(wherein Y is a structural portion derived from an acrylic monomer; Z is a structural portion derived from the acrylic monomer, which has a graft portion derived from a siloxane; k is a positive number of 1 to 3,000; and n is a positive number of 1 to 3,000).

In the general formula (1), the repeating unit number k is a positive number of 1 to 3,000, preferably 1 to 300, and the repeating unit number n is a positive number of 1 to 3,000, preferably 1 to 300.

In the present invention, the term "acrylic monomer" is intended to include acrylic acid, derivatives thereof, methacrylic acid and derivatives thereof. The acrylic monomer is a radically polymerizable acrylic monomer, and examples thereof include acrylic acid, methyl acrylate, ethyl acrylate, octyl acrylate, dodecyl acrylate, 2-ethylhexyl acrylate, propyl acrylate, n-butyl acrylate, isobutyl acrylate, sec-butyl acrylate, tert-butyl acrylate, 2,2-dimethylpropyl acrylate, cyclohexyl acrylate, 2-tert-butylphenyl acrylate, 2-naphtyl acrylate, phenyl acrylate, 4-methoxyphenyl acrylate, 2-methoxycarbonylphenyl acrylate, 2-ethoxycarbonylphenyl acrylate, 2-cholorophenyl acrylate, 4-chlorophenyl acrylate, benzyl acrylate, 2-cyanobenzyl acrylate, 4-cyanophenyl acrylate, p-tolyl acrylate, isononyl acrylate, 2-hydroxyethyl acrylate, 2-hydroxypropyl acrylate, 2-hydroxybutyl acrylate, 2-cyanoethyl acrylate, 3-oxabutyl acrylate, methacrylic acid, methyl methacrylate, ethyl methacrylate, octyl methacrylate, dodecyl methacrylate, 2-ethylhexyl methacrylate, propyl methacrylate, n-butyl methacrylate, isobutyl methacrylate, sec-butyl methacrylate, tert-butyl methacrylate, 2,2-dimethylpropyl methacrylate, cyclohexyl methacrylate, 2-tert-butylphenyl methacrylate, 2-naphtyl methacrylate, phenyl methacrylate, 4-methoxyphenyl methacrylate, 2 -methoxycarbonylphenyl methacrylate, 2-ethoxycarbonylphenyl methacrylate, 2-chlorophenyl methacrylate, 4-chlorophenyl methacrylate, benzyl methacrylate, 2-cyanobenzyl methacrylate, 4-cyanophenyl methacrylate, p-tolyl methacrylate, isononyl methacrylate, 2-hydroxyethyl methacrylate, 2-hydroxypropyl methacrylate, 2-hydroxybutyl methacrylate, 2-cyanoethyl methacrylate, 3-oxabutyl methacrylate, γ-methacryloyloxypropyl-trimethoxysilane, acrylamide, butylacrylamide, N,N-dimethylacrylamide, piperidylacrylamide, methacrylamide, 4-carboxyphenyl-methacrylamide, 4-methoxycarboxyphenyl-methacrylamide, methyl chloroacrylate, ethyl α-chloroacrylate, propyl α-chloroacrylate, isopropyl α-chloroacrylate, methyl α-fluoroacrylate, butyl α-butoxycarbonylmethacrylate, butyl α-cyanoacrylate, methyl α-phenylacrylate, isobornyl acrylate, isobornyl methacrylate and diethylaminoethyl methacrylate. A structural portion represented by —(Y)$_k$— is formed by homopolymerization or copolymerization of any of these acrylic monomers.

In the general formula (1), the structural portion Z is derived from a compound represented by the following general formula (2) or (3):

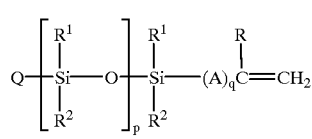 (2)

(Wherein $R^1$ and $R^2$ may be the same or different, each representing an alkyl group or a phenyl group having 1 to 20 carbon atoms, and may be the same or different for each repeating unit; p is a positive number of 3 to 520; A is a divalent linkage group, preferably selected from the group consisting of —$CH_2CH(OH)CH_2OCO$—, —$(CH_2)_{n'}NHCH_2CH(OH)CH_2OCO$—, —$(CH_2)_{n'}OCO$—, —$(CH_2)_{n'}O(CH_2)_{m'}OCO$—, —$OCH_2CH(OH)CH_2OCO$— or

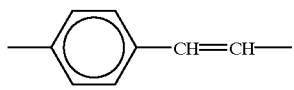

(wherein n' is a positive number of 0 to 6 and m' is a positive number of 2 to 6); q is 0 or 1; R is a hydrogen atom or an alkyl group; and Q is a methyl group, a phenyl group or $CH_2=CR—(A)_q—$ (wherein R, A and q are the same as those described above); or

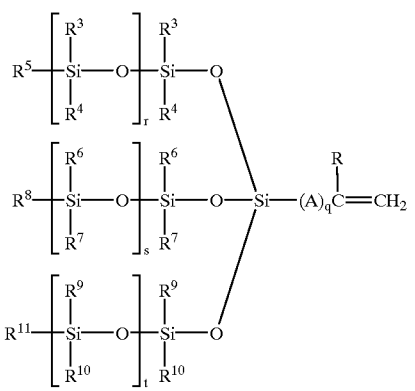 (3)

(wherein $R^1$ to $R^{11}$ may be the same or different, each representing an alkyl group or a phenyl group having 1 to 20 carbon atoms, and may be the same or different for each repeating unit; r is a positive number of 1 to 200; s is a positive number of 1 to 200; t is a positive number of 1 to 200; and A, q and R are the same as those previously described).

Specific preferred examples of the compound represented by the general formula (2) or (3) are compounds represented by the following structural formulae (a) to (r):

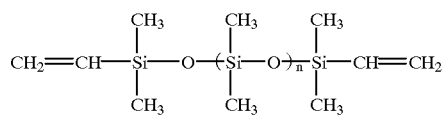 (a)

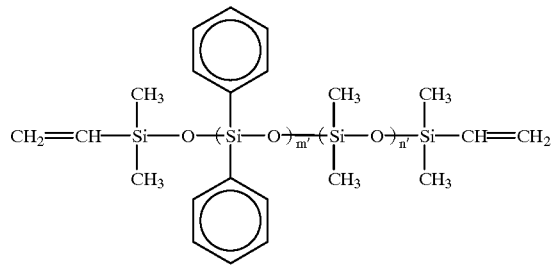 (b)

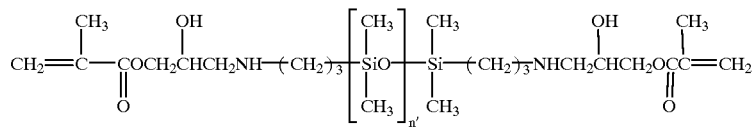 (c)

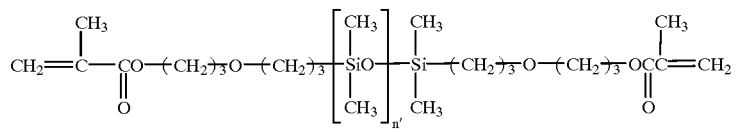 (d)

(e)
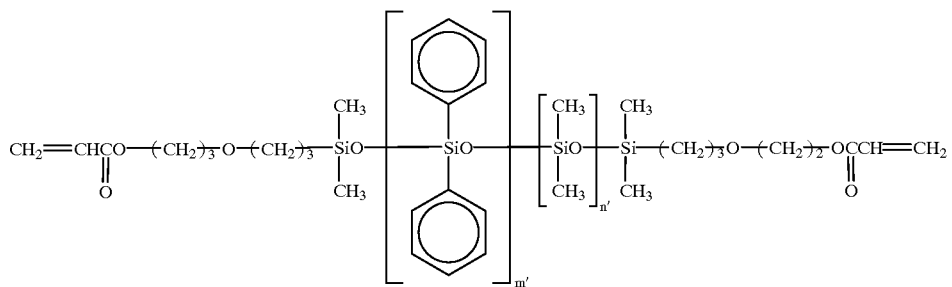
(f)
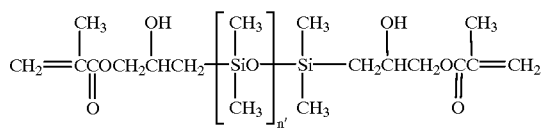
(g)
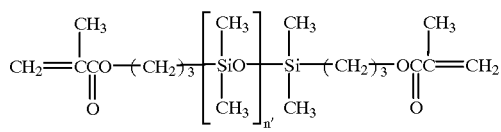
(h)
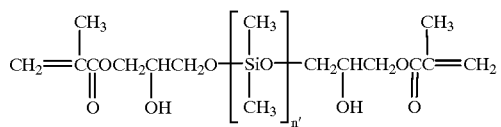
(i)
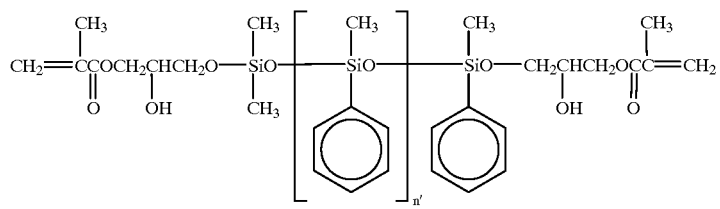
(j)
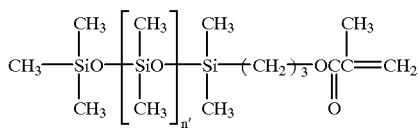
(k)
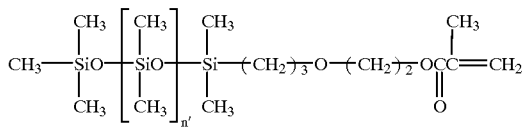
(l)
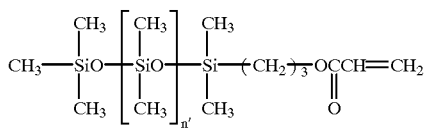

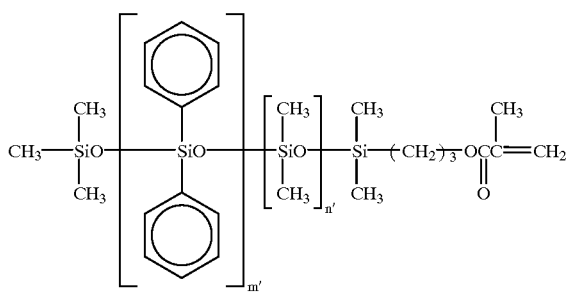
(m)
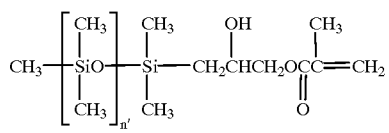
(n)
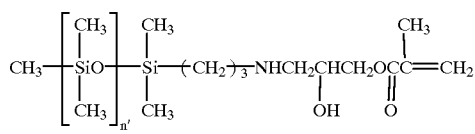
(o)
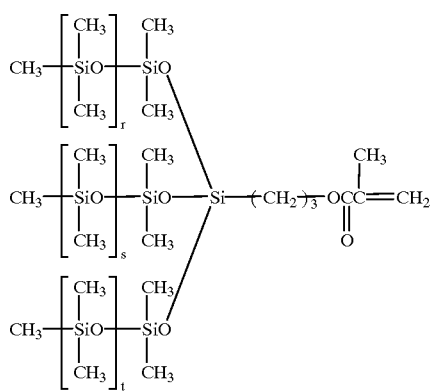
(p)
(wherein r, s and t are the same as those previously described.)
(wherein r, s and t are the same as those previously described.)
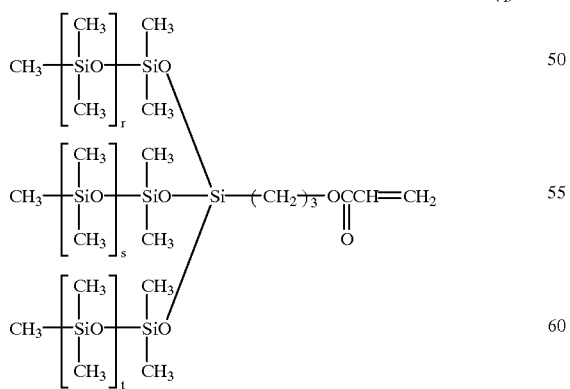
(q)

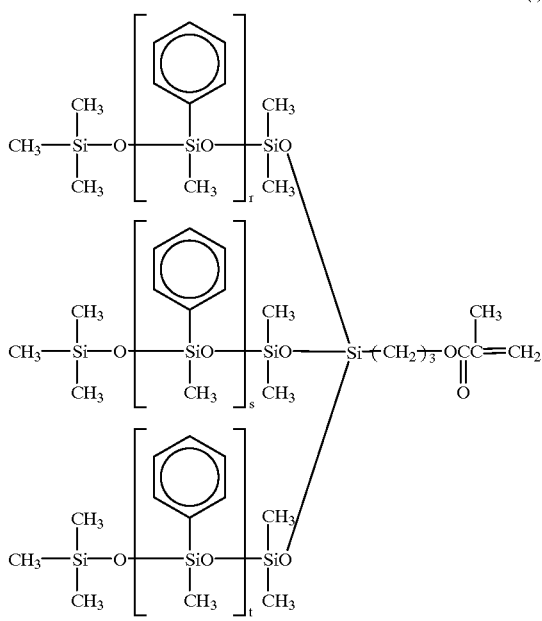

(wherein r, s and t are the same as those previously described.)

The silicone-grafted acrylic polymer (A) containing the repeating units represented by the above general formula (1) can be prepared, for example, by radically copolymerizing the portion represented by Y and the portion represented by Z in the presence of an azo-type polymerization initiator. This copolymerization is preferably achieved by a solution polymerization method using a solvent, a bulk polymerization method, an emulsion polymerization method or the like. Particularly, the solution polymerization method is preferred.

Examples of the azo-type polymerization initiator include azobisisobutyronitrile (AIBN), azobis-4-cyanovaleric acid, azobis(2,4-dimethylvaleronitrile), azobis(4-methoxy-2,4-dimethylvaleronitrile), dimethyl-2,2'-azobisisobutyrate, and azobis-1-cyclohexacarbonitrile, among which AIBN is particularly preferred.

The temperature for the radical copolymerization is preferably 50 to 150° C., more preferably 60 to 100° C., and the duration of the polymerization is preferably 3 to 100 hours, more preferably 5 to 10 hours.

The acrylic polymer portion of the silicone-grafted acrylic polymer (A) exclusive of the siloxane-derived graft portion should have a glass-transition temperature of −35 to 30° C., preferably −30 to 0° C. If the glass-transition temperature of the acrylic polymer portion is less than −35° C., the resulting silicone-grafted acryl polymer has a greater adhesiveness and a greater friction coefficient, so that the conductive roll is more liable to cause toner filming and suffer image quality deterioration. On the contrary, if the glass-transition temperature exceeds 30° C., the surface layer of the resulting conductive roll becomes so hard that smooth rotation of the conductive roll cannot be ensured at the start-up and a clicking sound occurs. Further, when other components are kept in pressing contact with the conductive roll, a contact trace may be left on the surface of the conductive roll.

The glass-transition temperature of the acrylic polymer portion may be controlled in the following manner. The weight ratios of respective acrylic monomers to be used are determined according to the following Fox formula so as to set the glass transition temperature of the acrylic polymer portion within the range from −35 to 30° C.:

$$1/Tg=(W_1/Tg_1)+(W_2/Tg_2)+ \ldots +(W_m/Tg_m)$$

$$W_1+W_2+ \ldots +W_m=1$$

(wherein Tg is the glass-transition temperature of the acrylic polymer portion; $Tg_1$, $Tg_2$, ... and $Tg_m$ are glass-transition temperatures of the respective acrylic monomers; and $W_1$, $W_2$, ... $W_m$ are weight ratios of the respective acrylic monomers).

The glass-transition temperature (Tg) may be measured by DSC (differential scanning calorimetry) or by the tan δ peak of the dynamic viscoelasticity of the acrylic polymer portion.

The specific silicone-grafted acrylic polymer (A) preferably has a number average molecular weight of 10,000 to 300,000, more preferably 30,000 to 100,000. If the number average molecular weight of the silicone-grafted acrylic polymer (A) is less than 10,000, the surface layer of the conductive roll tends to have a lower strength. If the number average molecular weight is higher than 300,000, the formation of the surface layer of the conductive roll becomes difficult. The number average molecular weight is herein defined as a number average molecular weight as determined by a polystyrene-based gel permeation chromatography (GPC) method.

A structural portion $-(Z)_n-$ of the silicone-grafted acrylic polymer (A) preferably has a number average molecular weight of 260 to 100,000, more preferably 2,000 to 50,000. If the number average molecular weight of the structural portion $-(Z)_n-$ is less than 260, the effect of the silicone grafting for the improvement of flexibility and releasability and the reduction of friction coefficient will lessen. If the number average molecular weight is higher than 100,000, tackiness unique to silicone occurs.

The structural portion $-(Z)_n-$ is preferably present in a proportion of 5 to 60% by weight of the total weight of the silicone-grafted acrylic polymer (A). If the proportion of the structural portion $-(Z)_n-$ is less than 5% by weight, the effect of the silicone grafting for the improvement of flexibility and releasability and the reduction of friction coefficient will lessen. If the proportion is higher than 60% by weight, tackiness unique to silicone occurs.

The specific silicone-grafted acrylic polymer (A), which has the structural portions of repeating units represented by the above general formula (1), may further comprise a structural portion $-(X)_m-$ composed of a structural portion X derived from another acrylic monomer, as represented by the following general formula (4):

$$-(Y)_k--(X)_m--(Z)_n- \qquad (4)$$

(wherein Y and X are different structural portions respectively derived from different acrylic monomers; Z is a structural portion derived from an acrylic monomer, which has a graft portion derived from a siloxane; k is a positive number of 1 to 3,000; m is a positive number of 1 to 10,000; and n is a positive number of 1 to 3,000).

In the general formula (4), the structural portion —(X)$_m$— may be derived from any of the acrylic monomers previously described. However, the structural portions Y and X should be different from each other. The repeating unit number m is a positive number of 1 to 10,000, preferably 100 to 3,000.

The isocyanate curing agent (B) is not particularly limited, as long as it serves as a curing agent for the silicone-grafted acrylic polymer (A). Examples thereof include blocked isocyanates and polyisocyanates, which may be used either alone or in combination.

For example, a blocked isocyanate having the following skeleton (hexamethylene diisocyanate (HDI) in isocyanurate form) is preferably used.

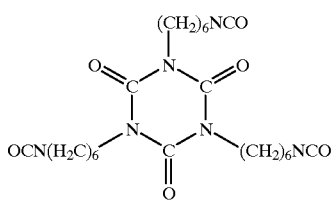

The blocked isocyanate is obtained by reacting a blocking agent with isocyanurate-form hexamethylene diisocyanate (HDI) represented by the above structural formula. The blocking agent is not particularly limited, but examples thereof include alcohols, phenols, ε-caprolactam, oximes and activated methylene compounds. Glycol-linked isocyanurate-form HDI may be reacted with the blocking agent for preparation of the blocked isocyanate.

An example of the blocked isocyanate is represented by the following structural formulae.

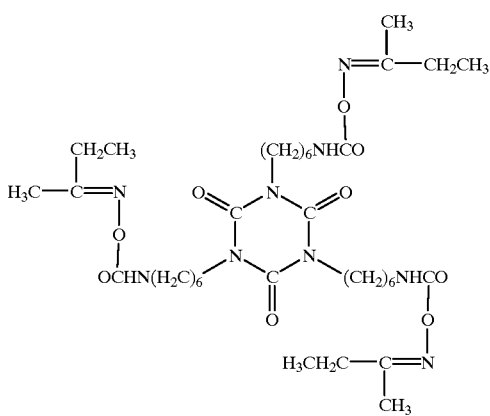

When the blocked isocyanate is heated at 130° C. or higher, as required, in the presence of a dissociation catalyst, methyl ethyl ketoxime is dissociated from the blocked isocyanate, thereby regenerating —NCO groups. The regenerated —NCO groups serve to react with —OH groups in the silicone-grafted acrylic polymer (A).

Examples of the polyisocyanate include isocyanate compounds such as diphenylmethane diisocyanate (MDI), isophorone diisocyanate (IPDI), dicyclohexylmethane diisocyanate (hydrogegated MDI), trimethylhexamethylene diisocyanate (TMHDI), tolylene diisocyanate (TDI), carbodiimide-modified MDI, polymethylenephenyl polyisocyanate (PAPI), o-toluidine diisocyanate (TODI), naphthylene diisocyanate (NDI), xylene diisocyanate (XDI), hexamethylene diisocyanate (HMDI), p-phenylene diisocyanate (PDI), lysine diisocyanate methyl ester (LDI) and dimethyl diisocyanate (DDI). These may be used either alone or in combination. Further, adducts and biurets of these isocyanate compounds may be used. Where the polyisocyanate is employed as the isocyanate curing agent (B), efficient production of the conductive roll is possible because removal of blocking groups is not necessary.

The content of the isocyanate curing agent (B) in the specific resin composition is preferably such that the ratio (NCO/OH ratio) of an NCO-group amount as calculated from the following formula (α) to an OH-group amount as calculated from the following formula (β) is in the range of 2 to 20, more preferably 4 to 6. If the NCO/OH ratio is less than 2, the resulting silicone-grafted acrylic polymer (A) has a sticky acrylic polymer portion, causing toner deposition. Therefore, a normal charging balance between toner and the silicone-grafted acrylic polymer is disturbed, so that a reversely-charged toner occurs due to toner-to-toner charging. Conversely, if the NCO/OH ratio is higher than 20, the merit in the charge property offered by the silicone component is impaired thereby to deteriorate the charging property of the conductive roll. Further, the roll has a higher hardness.

$$\text{NCO group amount} = \frac{\text{Total weight of effective NCO groups for reaction in component } B}{\text{Total weight of components } A \text{ and } B} \times \frac{1}{42.02} \quad (\alpha)$$

$$\text{OH group amount} = \frac{\text{Total weight of OH groups in component } A}{\text{Total weight of components } A \text{ and } B} \times \frac{1}{17.01} \quad (\beta)$$

In the above formula (α), "effective NCO groups for reaction" are, for example, NCO groups enclosed by a dotted line in the following structural formula.

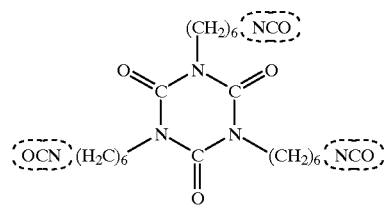

The specific resin composition may comprise an acryl-grafted silicone polymer (C) in addition to the silicone-grafted acrylic polymer (A) and the isocyanate curing agent (B). When the surface layer of the conductive roll is formed of the resin composition containing the acryl-grafted silicone polymer (C) along with the components (A) and (B), the acryl-grafted silicone polymer (C) deposits on the surface of the surface layer during solvent volatilization, so that the surface layer of the conductive roll is prevented from being perfectly covered with the silicone component. This prevents the toner filming which may otherwise occur due to overcharged toner, thereby further enhancing the toner releasability.

The acryl-grafted silicone polymer (C) has a linear structural portion (backbone) derived from a siloxane and a structural portion (side chain) derived from an acrylic monomer. The siloxane-derived linear structural portion preferably has a structure represented by any of the following general formulae (5) to (7):

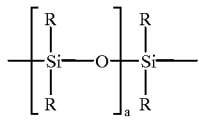  (5)

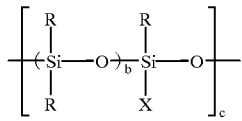  (6)

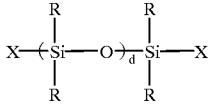  (7)

(wherein R may be the same or different, each representing an alkyl group or a phenyl group having 1 to 20 carbon atoms; X may be the same or different, each representing a hydrogen atom, a halogenated hydrocarbon group or a cyanohydrocarbon group, and may be the same or different for each repeating unit; a is a positive number of 3 to 520; b and c are positive numbers which satisfy $c(b+1) \geqq 4$; and d is any positive number).

Specific preferred examples of the structural portion represented by the general formula (5) are as follows:

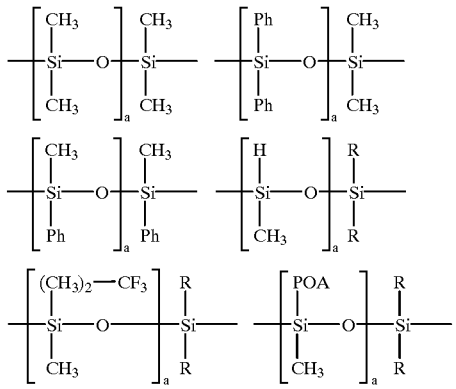

(wherein a and R are the same as previously described; and POA is a polyoxyalkylene group such as a polyoxyethylene group or a polyoxyisopropylene group).

In the general formulae (6) and (7), examples of the halogenated hydrocarbon group represented by X include halogenated alkyl groups, halogenated aryl groups, halogenated aralkyl groups, and halogenated alkenyl groups. Examples of the cyanohydrocarbon group represented by X include a cyano group, cyanoalkyl groups, cyanoaryl groups, cyanoaralkyl groups and cyanoalkenyl groups.

The molecular weight of the siloxane-derived linear structural portion is preferably in the range from 1,500 to 20,000, more preferably from 3,000 to 10,000. If the molecular weight is less than 1,500, the resulting resin composition has an unsatisfactory charge property. Further, it is difficult to reduce the frictional coefficient of the resin composition and to ensure the effect of the incorporation of the silicone component for improvement of the releasability. If the molecular weight is greater than 20,000, silicone tackiness and efficacy reduction tends to take place due to an inferior compatibility.

The acryl-derived structural portion (side chain) preferably contains a structure such as represented by the following general formula (8). Examples of the acrylic monomer include those previously mentioned. These acrylic monomers are homopolymerized or copolymerized to constitute the structural portion derived therefrom.

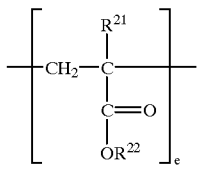  (8)

(wherein $R^{21}$ is a hydrogen atom or an alkyl group; $R^{22}$ is an alkyl group; and e is a positive number of 1 to 500).

Specific preferred examples of the structural portion represented by the general formula (8) are those represented by the following structural formulae:

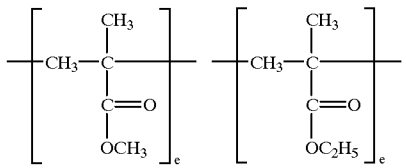

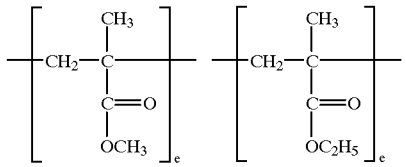

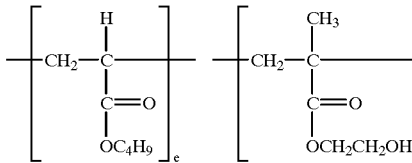

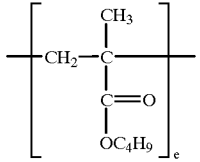

(wherein e is the same as described above).

The molecular weight of the acryl-derived structural portion is preferably in the range of 200 to 20,000, more preferably from 1,000 to 10,000. If the molecular weight is less than 200, it is difficult to offer the above-mentioned effects due to an inappropriate charge property. If the molecular weight is greater than 20,000, it is also difficult to offer the above-mentioned effects.

The acryl-grafted silicone polymer (C) may be prepared by grafting the siloxane-derived structural portion with the acryl-derived structural portion in the presence of azo type polymerization initiator.

Alternatively, the acryl-grafted silicone polymer (C) may be prepared by anionic polymerization of the siloxane-derived structural portion with the acryl-derived structural portion in the presence of an anionic polymerization catalyst. Examples of the anionic polymerization catalyst include alkali metals such as lithium and sodium, alkali metal alkyls obtained from any of the above alkali metals and aliphatic hydrocarbons such as methane, ethane, propane and butane and alkali metal alkyls obtained from any of the above alkali metals and aromatic hydrocarbons such as naphthalene, anthracene, phenanthrene, triphenylene, naphthacene, acenaphthylene, trans-stilbene, biphenyl, styrene, methylstyrene, divinylbenzene, benzonitrile, diphenylethylene, and diphenylbutadiene. Further, an oligomer of polymerized acryl monomer may be added to a hydrosilyl group of the siloxane-derived structural portion by use of a platinum catalyst.

The molecular weight of the acryl-grafted silicone polymer (C) thus obtained is preferably in the range of 3,000 to 300,000, more preferably 10,000 to 100,000. If the molecular weight is less than 3,000, it is difficult to offer the effects previously mentioned, and contamination of a photoreceptor may result from bleeding. If the molecular weight is greater than 300,000, compatibility with other materials is reduced, resulting in separation thereof and deterioration in the friction reducing effect.

The acryl-derived structural portion (side chain) of the acryl-grafted silicone polymer (C) should have a glass-transition temperature (Tg) of 30 to 150° C., preferably 60 to 120° C. If the glass-transition temperature of the acryl-derived structural portion (side chain) is lower than 30° C., there is a difficulty in reducing a frictional coefficient, resulting in an inferior releasability. Further, a preventive effect of tackiness tends to be reduced. If the glass-transition temperature is greater than 150° C., a lower solubility in a solvent and an inferior toner releasability may result. The glass-transition temperature (Tg) is measured according to the Fox method previously mentioned.

The acryl-grafted silicone polymer (C) contains the siloxane-derived linear structural portion (backbone, B) and the acryl-derived structural portion (side chain, S) preferably in a weight ratio of B/S=5/95 to 80/20, more preferably B/S=10/90 to 40/60. If the B/S weight ratio is greater than 80/20, the excess amount of the silicone component causes toner to be overcharged, resulting in frequent toner filming. If the B/S weight ratio is less than 5/95, the relative amount of the silicone component becomes smaller, making it difficult to obtain an appropriate charging property and releasability.

The acryl-grafted silicone polymer (C) is preferably present in the resin composition in a proportion of 5 to 80 parts by weight (hereinafter, abbreviated to parts), more preferably 10 to 40 parts by weight, based on 100 parts by weight of the silicone-grafted acrylic polymer (A).

A conductive material as mentioned above may optionally be added to the specific resin composition containing the silicone-grafted acrylic polymer (A), the isocyanate curing agent (B) and the acryl-grafted silicone polymer (C) for the formation of the surface layer of the conductive roll of the present invention. Moreover, additives such as an charge-controlling agent, a stabilizer, an ultraviolet ray absorbent, a reinforcing agent, a lubricant, a releasing agent, a dye, a pigment, a flame retardant and an oil may optionally be added to the resin composition. Examples of the charge-controlling agent include quaternary ammonium salts, borates, azine (nigrosine) compounds, azo compounds hydroxynaphthoic acid metal complexes, surfactants (anionic, cationic and nonionic surfactants).

The specific resin composition may be prepared in the following manner. The silicone-grafted acryl polymer (A), the isocyanate curing agent (B) and the acryl-grafted silicone polymer (C) are first prepared in the aforesaid manner, and dissolved in an organic solvent. Then, if necessary, a coating liquid is prepared by dispersing the conductive agent, the charge controlling agent and the like in the resulting solution by means of a sand mill or the like. Examples of the organic solvent include methyl ethyl ketone, toluene, tetrahydrofuran, dimethyl formamide, dimethyl sulfoxide, methyl isobutyl ketone, cyclohexane, methanol and isopropyl alcohol. These may be used either alone or in combination.

The preparation of the coating liquid composition may be achieved by dispersing the silicone-grafted acryl polymer (A), the isocyanate curing agent (B), the acryl-grafted silicone polymer (C), the conductive agent and the like by means of a biaxial kneader, and dissolving the resulting mixture in an organic solvent as described above. Thus, the intended resin composition (coating liquid) can be prepared.

The conductive roll of the present invention can be prepared in the following manner by using the specific resin composition (coating liquid). The material for the base rubber layer 2 is prepared by kneading the respective components by means of a mixing machine such as a kneader. The material (coating liquid) for the intermediate layer 3 is prepared by kneading the respective components by means of a mixing machine such as a roll mill and adding an organic solvent as described above to the resulting mixture which is then stirred. Thus, the material (coating liquid) for the intermediate layer 3 is prepared.

Figure 2:
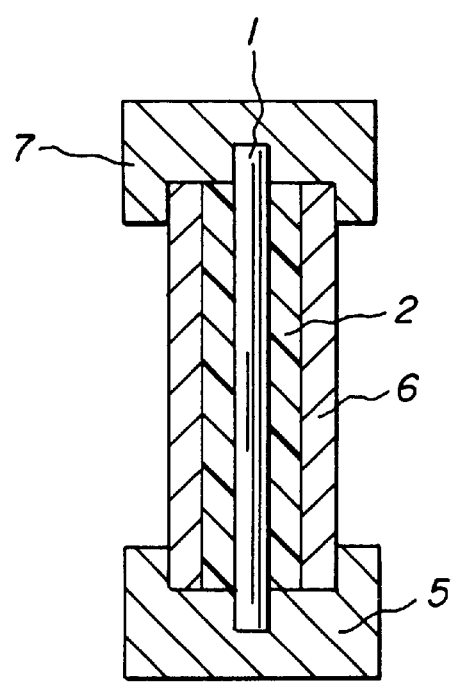
FIG. 2 is a cross-sectional view for explaining one exemplary method for preparing a conductive roll according to the present invention.
Figure 3:
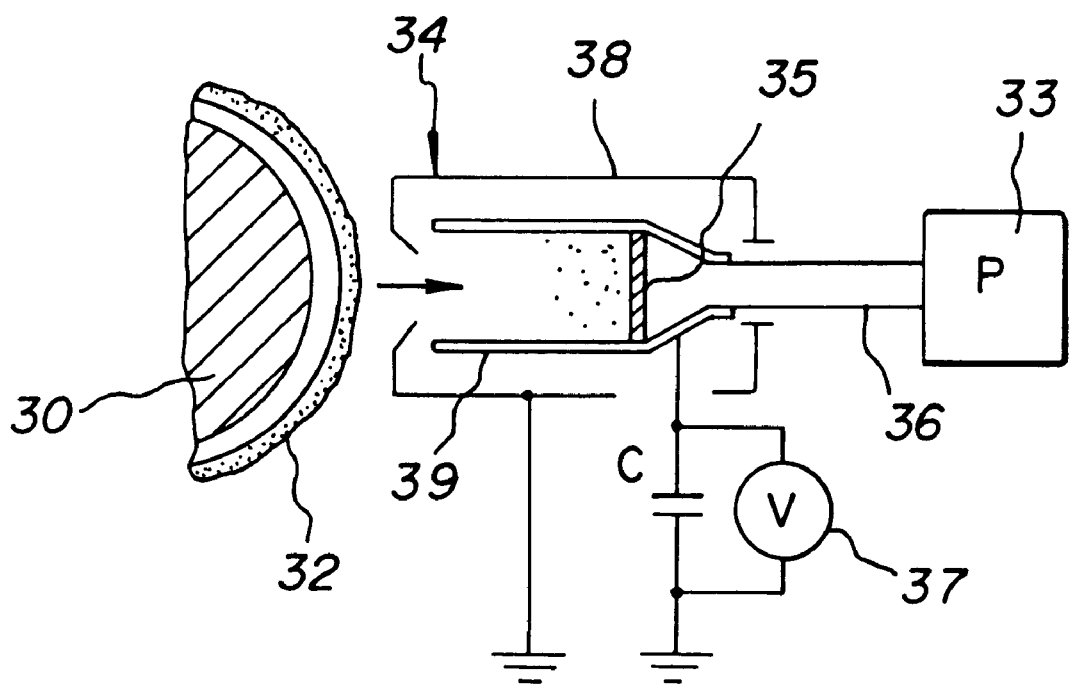
FIG. 3 is a schematic view for explaining a method of measuring a toner charge.

Referring to the FIG. 2, the shaft 1 is first prepared, which is optionally coated with the adhesive, the primer and the like. Then, the shaft 1 is placed inside a cylindrical mold 6 with its bottom capped with a bottom cap 5 and, after the base rubber layer material is poured into the cylindrical mold 6, the top of the cylindrical mold 6 is capped with a top cap 7. The entire roll mold is heated at a temperature of 150 to 220° C. for 30 minutes for vulcanization of the base rubber layer material. Thus, the base rubber layer 2 is formed. The shaft 1 formed with the base rubber layer 2 is removed from the mold and, as required, heated at 200° C. for 4 hours for completion of the vulcanization. As required, the surface of the resulting roll is treated by corona discharge, and coated with a coupling agent. Subsequently, the coating liquid of the intermediate layer material is applied on the peripheral surface of the base rubber layer 2 or, alternatively, the roll formed with the base rubber layer 2 is dipped in the coating liquid. Then, the resulting roll is dried and subjected to a heat treatment. Thus, the intermediate layer 3 is formed on the base rubber layer 2. Furthermore, the surface layer material, i.e., the specific resin composition (coating liquid) is applied on the peripheral surface of the intermediate layer 3 or, alternatively, the roll formed with the intermediate layer 3 is dipped in the coating liquid. Then, the resulting roll is dried and subjected to a heat treatment. Thus, the surface layer 4 is formed on the intermediate layer 3. The method of the application of the coating liquid is not particularly limited, but exemplary application methods include a dip coating method, a spray coating method and a roll coating method. Thus, the conductive roll is produced which has the base rubber layer 2 formed on the peripheral surface of the shaft 1, the intermediate layer 3 formed on the peripheral surface of the base rubber layer 2, and the surface layer 4 formed on the intermediate layer 3.

The thicknesses of the respective layers of the conductive roll according to the present invention is suitably determined depending on the use of the conductive roll. For use as a developing roll, the base rubber layer, the intermediate layer and the surface layer typically have a thickness of 0.5 to 10 mm, preferably 3 to 6 mm; a thickness of 1 to 90 μm, preferably 3 t 30 μm; and a thickness of 3 to 100 μm, preferably 5 to 50 μm, respectively.

The conductive roll of the present invention is suitably applied to a developing roll, but not limited thereto. It is to be understood that the present invention is applicable to a transfer roll, a charge roll and the like.

The present invention will hereinafter be explained by way of Examples and Comparative Examples thereof.

Prior to Examples and Comparative Examples, the following surface layer materials were prepared.

[Silicone-grafted acrylic polymer A]
A silicone-grafted acrylic polymer having the following repeating unit as its base units (Average molecular weight: 40,000, glass-transition temperature of the acrylic polymer portion: −15° C.)

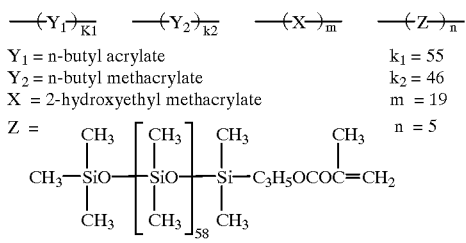

Y₁ = n-butyl acrylate   $k_1 = 55$
Y₂ = n-butyl methacrylate  $k_2 = 46$
X = 2-hydroxyethyl methacrylate  $m = 19$
                                  $n = 5$

[Silicone-grafted acrylic polymer B]
A silicone-grafted acrylic polymer having the following repeating units as its base units (Average molecular weight: 50,000, glass-transition temperature of the acrylic polymer portion: −30° C.)

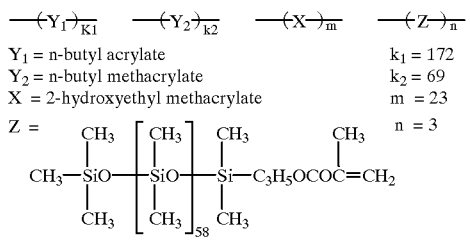

Y₁ = n-butyl acrylate   $k_1 = 172$
Y₂ = n-butyl methacrylate  $k_2 = 69$
X = 2-hydroxyethyl methacrylate  $m = 23$
                                  $n = 3$

[Silicone-grafted acrylic polymer C]
A silicone-grafted acrylic polymer having the following repeating units as its base units (Average molecular weight: 50,000, glass-transition temperature of the acrylic polymer portion: 30° C.)

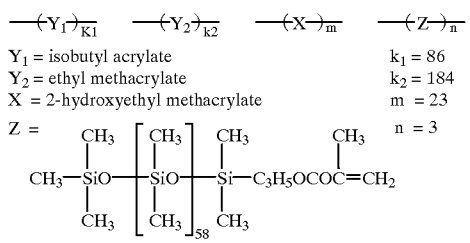

Y₁ = isobutyl acrylate   $k_1 = 86$
Y₂ = ethyl methacrylate  $k_2 = 184$
X = 2-hydroxyethyl methacrylate  $m = 23$
                                  $n = 3$

[Acryl-grafted silicone polymer]
Average molecular weight: 8,000, glass-transition temperature of the acryl-derived structural portion: 80° C.

[Blocked isocyanate*1]
Burnock DB980K manufactured by Dainippon Ink and Chemicals Incorporated

[Blocked isocyanate*2]
Burnock B8-117 manufactured by Dainippon Ink and Chemicals Incorporated

[Blocked isocyanate*3]
Burnock D500 manufactured by Dainippon Ink and Chemicals Incorporated

[Polyisocyanate*4]
Burnock DN955 manufactured by Dainippon Ink and Chemicals Incorporated

[Polyisocyanate*5]
Burnock DN990 manufactured by Dainippon Ink and Chemicals Incorporated

[Polyisocyanate*6]
Burnock DN980 manufactured by Dainippon Ink and Chemicals Incorporated

[Conductive agent*7]
Carbon black (Toka Black #5500 manufactured by Tokai Carbon Co., Ltd.)

[Conductive agent*8]
c-TiO₂ (Tipaque ET500W manufactured by Ishihara Sangyo Kaisha, Ltd.)

[Silica]
Aerosil 200 manufactured by Nippon Aerosil Co., Ltd.

EXAMPLE 1
[Ease Rubber Layer]
The material for the base rubber layer was prepared by mixing and dispersing X-34-424 A/B and X-34-387 A/B manufactured by Shin-Etsu Chemical Co., Ltd. The mixing ratio of the X-34-424 A/B and the X-34-387 A/B was adjusted so that a rubber sheet made of the base rubber layer material had a volume resistivity of $5 \times 10^5$ to $1 \times 10^7$ Ω·cm. The volume resistivity was calculated from the following equation.

$$\text{Volume resistivity (Ω·cm)} = \frac{19.635(\text{cm}^2) \times \text{resistance}(\Omega)}{\text{Thickness of sheet}}$$

The resistance (Ω) in the equation was measured in a measurement range of $1 \times 10^8$ to $1 \times 10^{-3}$ Ω by means of 3222Hi Tester manufactured by Hioki Electric Co., Ltd. with the rubber sheet being held between a stainless plate electrode and a circular plate electrode with a diameter of 50 mm.

A metal rod (SUS304) with a diameter of 10 mm which later served as a shaft was set in a hollow portion of a cylindrical mold with its bottom capped with a bottom cap. The base rubber layer material was poured into a space defined between the cylindrical mold and the shaft. Then, the top of the mold was capped with a top cap, and the entire mold was heated in an oven for vulcanization of the base rubber layer material. Thereafter, the resulting roll was removed from the mold. Consequently, the shaft formed with the base rubber layer (base roll) was prepared. The base rubber layer had a hardness of 40 Hs (JIS A) and a thickness of 5 mm.

[Intermediate Layer]

First, 100 parts of H-NBR (Zetpol 0020 manufactured by Nippon Zeon Co., Ltd.), 30 parts of a conductive agent (carbon black, Toka Black #5500 manufactured by Tokai Carbon Co., Ltd.), 0.5 parts of stearic acid, 5 parts of ZnO (zinc white), 1 part of a vulcanization accelerator BZ, 2 parts of a vulcanization accelerator CZ, and 1 part of sulfur were kneaded by means of a kneader and a roll mill. The resultant mixture was dispersed in an organic solvent for preparation of a coating liquid as an intermediate layer material. After the surface of the base rubber layer was treated by corona discharge, the coating liquid as the intermediate layer material was applied on the base rubber layer and heated at 150° C. for 30 minutes to form the intermediate layer. The intermediate layer had a thickness of 25 μm.

[Surface Layer]

A surface layer material was prepared by dispersing 100 parts of the silicone-grafted acrylic polymer (*A) previously provided, 20 parts of an acryl-grafted silicone polymer, 75 parts of a blocked isocyanate (*1) (Burnock DB980K manufactured by Dainippon Ink and Chemicals Incorporated), 10 parts of a conductive agent (Toka Black #5500 manufactured by Tokai Carbon Co., Ltd.), and 3 parts of silica (Aerosil 200 manufactured by Nippon Aerosil Co., Ltd.) in an organic solvent. Used as the organic solvent was a mixture containing ethyl acetate, MEK, toluene and MIBK in a weight ratio of 1:2:1:6. The amount of the organic solvent was adjusted so that the concentration of the solids was 23%. The surface layer was formed on the peripheral surface of the intermediate layer by applying the surface layer material and heating it at 150° C. for 1 hour. Consequently, a three-layered conductive roll was prepared which had the base rubber layer, the intermediate layer and the surface layer. The surface layer had a thickness of 10 μM.

EXAMPLES 2–5

Three-layered conductive rolls according to Examples 2 to 5 were each prepared in the same manner as, in Example 1 by employing a surface layer material shown in Table 1 for formation of the surface layer. The mixing amount of each Example in Table 1 (also in Tables 2 and 3) is described in parts by weight of each solid thereof.

TABLE 1

| | | EXAMPLES | | | | (parts) |
|---|---|---|---|---|---|---|
| | | 1 | 2 | 3 | 4 | 5 |
| Silicone-grafted acrylic polymer | *A | 100 | 100 | 100 | 100 | 100 |
| | *B | — | — | — | — | — |
| | *C | — | — | — | — | — |
| Acryl-grafted silicone polymer | | 20 | — | 100 | 20 | 20 |
| Block isocyanate | *1 | 75 | 75 | 75 | 50 | 28 |
| | *2 | — | — | — | — | — |
| | *3 | — | — | — | — | — |
| Polyisocyanate | *4 | — | — | — | — | — |
| | *5 | — | — | — | — | — |
| | *6 | — | — | — | — | — |
| Conductive agent | carbon black *7 | 10 | 10 | 10 | 10 | 10 |
| | c-TiO$_2$ *8 | — | — | — | — | — |
| NCO/OH ratio | | 5.43 | 5.43 | 5.43 | 3.62 | 2.03 |
| Thickness (μm) | | 10 | 10 | 10 | 10 | 10 |

EXAMPLE 6

[Base rubber layer]

A base rubber layer material was prepared by mixing 100 parts of a liquid silicone rubber and 10 parts of a conductive agent (carbon black). A metal rod (SUS304) with a diameter of 10 mm which later served as a shaft was set in a hollow portion of a cylindrical mold with its bottom capped with a bottom cap. The base rubber layer material was poured into a space defined between the cylindrical mold and the shaft. Then, the top of the mold was capped with a top cap, and the entire mold was heated in an oven for vulcanization of the rubber layer material. Thereafter, the resulting roll was removed from the mold. Consequently, the shaft formed with the base rubber layer (base roll) was prepared. The base rubber layer had a hardness of 30 Hs (JIS A) and a thickness of 5 mm.

[Intermediate Layer]

First, 100 parts of H-NBR (Zetpol 0020 manufactured by Nippon Zeon Co., Ltd.), 30 parts of a conductive agent (carbon black, Toka black #5500 manufactured by 東海カーボン 社), 0.5 parts of stearic acid, 5 parts of ZnO (zinc white), 1 part of a vulcanization accelerator BZ, 2 parts of a vulcanization accelerator CZ and 1 part of sulfur were kneaded by means of a kneader and a roll mill, and the resulting mixture was dispersed in an organic solvent for preparation of a coating liquid as an intermediate layer materials The coating liquid was applied onto the surface of the base rubber layer and heated at 150° C. for 30 minutes to form the intermediate layer. The intermediate layer had a thickness of 20 μm.

[Surface layer]

A surface layer material was prepared by dispersing 100 parts of the silicone-grafted acrylic polymer (*C) previously provided, 70 parts of the blocked isoyanate (* 2) (Burnock B-117 manufactured by Dainippon Ink and Chemicals Incorporated) and 15 parts of a conductive agent (Toka Black #5500 manufactured by Tokai Carbon Co., Ltd.) in an organic solvent. Used as the organic solvent was a mixture containing ethyl acetate, MEK, toluene and MIBK in a weight ratio of 1:2:1:6. The amount of the organic solvent was adjusted so that the concentration of the solids was 23%. The surface layer was formed on the peripheral surface of the intermediate layer by applying the surface layer material and heating it at 150° C. for 1 hour. Consequently, a three layered conductive roll was prepared which had the base rubber layer, the intermediate layer and the surface layer. The surface layer had a thickness of 15 μm.

EXAMPLES 7–9

Three-layered conductive rolls according to Examples 7 to 9 were each prepared in the same manner as in Example 6 employing a surface layer material shown in Table 2 for formation of the surface layer.

EXAMPLES 10–13

Three-layered conductive rolls according to Examples 10 to 13 were each prepared in the same manner as in Example 1 by employing a surface layer material shown in Table 2 and 3 for formation of the surface layer.

TABLE 2

|  |  | EXAMPLES (parts) | | | | |
|---|---|---|---|---|---|---|
|  |  | 6 | 7 | 8 | 9 | 10 |
| Silicone-grafted acrylic polymer | *A | — | — | — | — | — |
|  | *B | — | 100 | — | 100 | 100 |
|  | *C | 100 | — | 100 | — | — |
| Acryl-grafted silicone polymer |  | — | — | — | — | 20 |
| Block isocyanate | *1 | — | — | — | — | 13.8 |
|  | *2 | 70 | — | — | — | — |
|  | *3 | — | 60 | — | — | — |
| Polyisocyanate | *4 | — | — | 60 | — | — |
|  | *5 | — | — | — | 60 | — |
|  | *6 | — | — | — | — | — |
| Conductive agent | carbon black | *7 | 15 | 15 | 15 | — | 15 |
|  | c-TiO$_2$ | *8 | — | — | — | 100 | — |
| NCO/OH ratio |  | 3.05 | 3.69 | 2.63 | 5.35 | 1 |
| Thickness (μm) |  | 15 | 15 | 15 | 15 | 15 |

TABLE 3

|  |  | EXAMPLES | | | COMPARATIVE EXAMPLES (parts) | |
|---|---|---|---|---|---|---|
|  |  | 11 | 12 | 13 | 1 | 2 |
| Silicone-grafted acrylic polymer | *A | — | — | — | 100 | — |
|  | *B | 100 | 100 | 100 | — | — |
|  | *C | — | — | — | — | 20 |
| Ether TPU |  | — | — | — | — | 100 |
| Acryl-grafted silicone polymer |  | 20 | 20 | 20 | — | — |
| Block isocyanate | *1 | — | — | — | 13.8 | — |
|  | *2 | — | — | — | — | — |
|  | *3 | — | 16 | — | — | — |
| Polyisocyanate | *4 | — | — | — | — | — |
|  | *5 | — | — | — | — | — |
|  | *6 | 11.8 | — | 75 | — | — |
| Conductive agent | carbon black | *7 | 15 | 15 | 15 | 10 | 10 |
|  | c-TiO$_2$ | *8 | — | — | — | — | — |
| NCO/OH ratio |  | 1 | 1 | 7.85 | 1 | — |
| Thickness (μm) |  | 15 | 15 | 15 | 10 | 10 |

COMPARATIVE EXAMPLES 1 AND 2

A base rubber layer was formed in the same manner as in Example 1. After the surface of the base layer was treated by corona discharge, a surface layer was formed of a surface layer material shown in Table 3 on the peripheral surface of the base rubber layer. Thus, a two-layer conductive roll was prepared which had the base rubber layer and the surface layer. An organic solvent used for the preparation of the surface layer material in the Comparative Example 1 was the same as in Example 1. An organic solvent used in Comparative Example 2 was tetrahydrofuran.

The thus obtained conductive rolls of Examples 1 through 13 and Comparative Examples 1 and 2 were evaluated in the following manner in respect of smear resistance, toner filming resistance, torque, photoreceptor contamination, roll surface durability and image quality. The results of the evaluation are shown in Tables 4 to 6.

[Smear resistance]

The conductive rolls were each set as a developing roll in a printer, ML600L manufactured by Oki Data Co., Ltd. A developing operation was conducted in a blank chart mode and, when toner was fed to a photoreceptor drum (OPC), the developing operation was stopped. Toner having reached the photoreceptor drum was transferred onto a tape, and the tape was affixed onto a blank paper for measurement of the Macbeth density of the toner. A value obtained by subtracting a blank density value from the Macbeth density value was herein defined as a smear resistance value. In the tables, ○ indicates that the value was not greater than 0.04, Δ indicates that the value was greater than 0.04 and not greater than 0.08, and × indicates that the value was greater than 0.08. The bias voltages applied to the developing roll and a feed roll were −300V and −450V, respectively.

[Toner filming resistance]

A roll cartridge was fitted in a bench test machine under the same conditions as described above. After the roll was rotated by 30° (under the same rotation condition as the ML600L manufactured by Oki Data Co., Ltd.), the roll was removed and gently wiped for removal of the toner. Toner still remaining on the roll (filmed toner) was transferred onto a tape, and the tape was affixed onto a blank paper for measurement of the Macbeth density of the toner. In the tables, ○ indicates that a value obtained by subtracting a blank density value from the Macbeth density value was not greater than 0.04, Δ indicates that the value was greater than 0.04 and not greater than 0.06, × indicates that the value was greater than 0.06.

[Torque]

The conductive rolls were each set as a developing roll in a printer, ML600L manufactured by Oki Data Co., Ltd. An image outputting test was carried out, and the presence of a transverse streak in an outputted image which occurred due to gear mis-meshing was visually checked. In the tables, ○ indicates that there was no streak, and Δ indicates the occurrence of some streaks.

[Photoreceptor contamination]

The conductive rolls were each set, as a developing roll in a cartridge manufactured by Oki Data Co.; Ltd., and left at 35° C./RH 85% for one week. Then, an image outputting test was carried out, and the presence of a transverse streak (white streak) in an outputted solid black image was visually checked. In the tables, ○ indicates there was no streak, Δ indicates that streaks were observed only in the first three or less image outputs, and × indicates that streaks were observed in more than the first three image outputs.

[Roll surface durability]

The conductive rolls were each visually inspected after 3,000 copies were made. In the tables, ○ indicates that the roll surface was smooth and kept almost unchanged from the unused state thereof, Δ indicates that some indentations and burrs were observed on the roll surface but did not impair the outputted images, and × indicates that some indentations and burrs were observed on the roll surface and impaired the outputted images.

[Image quality]

The first and 3,000th image outputs including a character image and a picture image were visually checked for evaluation of the image quality thereof. In the tables, ○ indicates that there was no problem on images and even a fine line was sharp in the outputted image, and × indicates that blurriness, fog or the like took place. Blurriness means that a fine line was broken off, and fog means that toner was scattered in a non-image portion on a paper sheet.

TABLE 4

| | EXAMPLES | | | | |
|---|---|---|---|---|---|
| | 1 | 2 | 3 | 4 | 5 |
| Smear resistance | ○ (0.02) | ○ (0.03) | ○ (0.03) | ○ (0.04) | Δ (0.08) |
| Toner filming resistance | ○ (0.02) | Δ (0.06) | ○ (0.01) | ○ (0.03) | ○ (0.04) |
| Torque | ○ | Δ | ○ | ○ | Δ |
| Photoreceptor contamination | ○ | ○ | Δ | ○ | ○ |
| Roll surface durability | ○ | ○ | Δ | ○ | ○ |
| Image quality First | ○ | ○ | ○ | ○ | ○ |
| 3,000th | ○ | ○ | ○ | ○ | ○ |
| Comprehensive evaluation | ◎ | ○ | ○ | ◎ | ○ |

TABLE 5

| | EXAMPLES | | | | |
|---|---|---|---|---|---|
| | 6 | 7 | 8 | 9 | 10 |
| Smear resistance | Δ (0.05) | ○ (0.03) | Δ (0.05) | ○ (0.03) | ○ (0.02) |
| Toner filming resistance | Δ (0.06) | ○ (0.06) | Δ (0.06) | ○ (0.06) | ○ (0.02) |
| Torque | Δ | ○ | Δ | ○ | Δ |
| Photoreceptor contamination | Δ | ○ | Δ | ○ | ○ |
| Roll surface durability | ○ | ○ | ○ | ○ | Δ |
| Image quality First | ○ | ○ | ○ | ○ | ○ |
| 3,000th | ○ | ○ | ○ | ○ | ○ |
| Comprehensive evaluation | Δ | ○ | Δ | ○ | Δ |

TABLE 6

| | EXAMPLES | | | COMPARATIVE EXAMPLES | |
|---|---|---|---|---|---|
| | 11 | 12 | 13 | 1 | 2 |
| Smear resistance | ○ (0.03) | ○ (0.03) | ○ (0.02) | Δ (0.08) | Δ (0.08) |
| Toner filming resistance | ○ (0.01) | ○ (0.02) | ○ (0.02) | × (0.15) | × (0.25) |
| Torque | Δ | Δ | ○ | ○ | × |
| Photoreceptor contamination | ○ | ○ | ○ | ○ | ○ |
| Roll surface durability | Δ | Δ | ○ | × | × |
| Image quality First | ○ | ○ | ○ | ○ | ○ |
| 3,000th | ○ | ○ | ○ | × | × |
| Comprehensive evaluation | Δ | Δ | ◎ | × | × |

As can be understood from the results shown in Tables 4 to 6, the conductive rolls of Examples 1 through 13 are superior in smear resistance and toner filming resistance to those of Comparative Examples 1 and 2.

INDUSTRIAL APPLICABILITY

As described hereinbefore, the conductive roll of the present invention has the surface layer formed of the resin composition containing the specific silicone-grafted acrylic polymer (A) and the isocyanate curing agent (B). The use of the component B enhances cross-linking of the component A, so that the surface layer having a properly cross-linked state can be formed. Consequently, the conductive roll of the present invention has a superior smear resistance and toner filming resistance.

Where the resin composition containing the acryl-grafted silicone polymer (C) in addition to the silicone-grafted acrylic polymer (A) and the isocyanate curing agent (B) is used for the formation of the surface layer, the acryl-grafted silicone polymer (C) deposits on the surface of the surface layer during solvent volatilization, so that the surface layer of the conductive roll is prevented from being perfectly covered with the silicone component. This prevents the toner filming which may otherwise occur due to overcharged toner, thereby further enhancing the toner releasability. As a result, the surface of the conductive roll has a lower frictional coefficient, so that the conductive roll can be operated with a lower torque.

What is claimed is:

1. A conductive roll comprising a base rubber layer formed on a peripheral surface of a shaft, an intermediate layer formed on a peripheral surface of the base rubber layer, and a surface layer formed on a peripheral surface of the intermediate layer, the surface layer being composed of a resin composition comprising:

(A) a silicone-grafted acrylic polymer which comprises repeating units represented by the following general formula (1), wherein an acrylic polymer portion of the silicone-grafted acrylic polymer exclusive of a structural portion derived from a siloxane has a glass-transition temperature of −35 to 30° C.:

wherein Y is a structural portion derived from an acrylic monomer; Z is a structural portion derived from the acrylic monomer, which has a graft portion derived from a siloxane; k is a positive number of 1 to 3,000; and n is a positive number of 1 to 3,000; and (B) an isocyanate curing agent.

2. The conductive roll according to claim 1, wherein the isocyanate curing agent (B) is at least one of a blocked isocyanate and a polyisocyanate.

3. The conductive roll according to claim 2, wherein the blocked isocyanate contains the following skeleton:

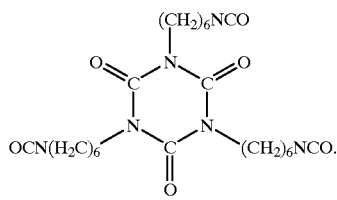

4. The conductive roll according to claim 3, wherein the isocyanate curing agent (B) is present in the resin composition in a proportion such that a ratio (NCO/OH ratio) of an NCO-group amount as calculated from the following formula ($\alpha$) to an OH-group amount as calculated from the following formula ($\beta$) is NCO/OH=2 to 20:

$$\text{NCO group amount} = \frac{\text{Total weight of effective NCO groups for reaction in component } B}{\text{Total weight of components } A \text{ and } B} \times \frac{1}{42.02} \quad (\alpha)$$

$$\text{OH group amount} = \frac{\text{Total weight of OH groups in component } A}{\text{Total weight of components } A \text{ and } B} \times \frac{1}{17.01}. \quad (\beta)$$

5. The conductive roll according to claim 4, wherein the resin composition further comprises:

(C) an acryl-grafted silicone polymer comprising a linear structural portion derived from a siloxane and a structural portion derived from an acrylic monomer, the acryl-derived structural portion having a glass transition temperature of 30 to 150° C.

6. The conductive roll according to claim 5, wherein the acryl-grafted silicone polymer (C) has a number average molecular weight of 1,000 to 100,000.

7. The conductive roll according to claim 1, wherein the resin composition further comprises:

(C) an acryl-grafted silicone polymer comprising a linear structural portion derived from a siloxane and a structural portion derived from an acrylic monomer, the acryl-derived structural portion having a glass transition temperature of 30 to 150° C.

8. The conductive roll according to claim 7, wherein the acryl-grafted silicone polymer (C) has a number average molecular weight of 1,000 to 100,000.

9. The conductive roll according to claim 2, wherein the resin composition further comprises:

(C) an acryl-grafted silicone polymer comprising a linear structural portion derived from a siloxane and a structural portion derived from an acrylic monomer, the acryl-derived structural portion having a glass transition temperature of 30 to 150° C.

10. The conductive roll according to claim 9, wherein the acryl-grafted silicone polymer (C) has a number average molecular of 1,000 to 100,000.

11. The conductive roll according to claim 3, wherein the resin composition further comprises:

(C) an acryl-grafted silicone polymer comprising a linear structural portion derived from a siloxane and a structural portion derived from an acrylic monomer, the acryl-derived structural portion derived from an acrylic monomer, the acryl-derived structural portion having a glass transition temperature of 30 to 150° C.

12. The conductive roll according to claim 11, wherein the acryl-grafted silicone polymer (C) has a number average molecular weight of 1,000 to 100,000.

13. The conductive roll according to claim 2, wherein the isocyanate curing agent (B) is present in the resin composition in a proportion such that a ratio (NCO/OH ratio) of an NCO-group amount as calculated from the following formula ($\alpha$) to an OH-group amount as calculated from the following formula ($\beta$) is NCO/OH=2 to 20:

$$NCO \text{ group amount} = \frac{\text{Total weight of effective } NCO \text{ groups for reaction in component } B}{\text{Total weight of components } A \text{ and } B} \times \frac{1}{42.02} \quad (\alpha)$$

$$OH \text{ group amount} = \frac{\text{Total weight of } OH \text{ groups in component } A}{\text{Total weight of components } A \text{ and } B} \times \frac{1}{17.01}. \quad (\beta)$$

14. The conductive roll according to claim 13, wherein the resin composition further comprises:

(C) an acryl-grafted silicone polymer comprising a linear structural portion derived from a siloxane and a structural portion derived from an acrylic monomer, the acryl-derived structural portion having a glass transition temperature of 30 to 150° C.

15. The conductive roll according to claim 14, wherein the acryl-grafted silicone polymer (C) has a number average molecular weight of 1,000 to 100,000.

16. The conductive roll according to claim 1, wherein the isocyanate curing agent (B) is present in the resin composition in a proportion such that a ratio (NCO/OH ratio) of an NCO-group amount as calculated from the following formula ($\alpha$) to an OH-group amount as calculated from the following formula ($\beta$) is NCO/OH=2 to 20:

$$\text{NCO group amount} = \frac{\text{Total weight of effective } NCO \text{ groups for reaction in component } B}{\text{Total weight of components } A \text{ and } B} \times \frac{1}{42.02} \quad (\alpha)$$

$$\text{OH group amount} = \frac{\text{Total weight of } OH \text{ groups in component } A}{\text{Total weight of components } A \text{ and } B} \times \frac{1}{17.01}. \quad (\beta)$$

17. The conductive roll according to claim 16, wherein the resin composition further comprises:

(C) an acryl-grafted silicone polymer comprising a linear structural portion derived from a siloxane and a structural portion derived from an acrylic monomer, the acryl-derived structural portion having a glass transition temperature of 30 to 150° C.

18. The conductive roll according to claim 17, wherein the acryl-grafted silicone polymer (C) has a number average molecular weight of 1,000 to 100,000.

* * * * *